US010591716B2

(12) United States Patent
Sekii et al.

(10) Patent No.: US 10,591,716 B2
(45) Date of Patent: Mar. 17, 2020

(54) ROTARY DRIVE APPARATUS

(71) Applicant: Nidec Corporation, Kyoto (JP)

(72) Inventors: Yoichi Sekii, Kyoto (JP); Takuro Iguchi, Kyoto (JP); Yuichi Shigematsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 98 days.

(21) Appl. No.: 15/957,986

(22) Filed: Apr. 20, 2018

(65) Prior Publication Data

US 2018/0348504 A1 Dec. 6, 2018

(30) Foreign Application Priority Data

May 30, 2017 (JP) ................. 2017-107202

(51) Int. Cl.
| | |
|---|---|
| *G02B 26/08* | (2006.01) |
| *H02K 7/02* | (2006.01) |
| *H02K 7/08* | (2006.01) |
| *H02K 7/00* | (2006.01) |
| *H02K 21/22* | (2006.01) |
| *H02K 7/14* | (2006.01) |
| *H02K 1/27* | (2006.01) |
| *G02B 26/10* | (2006.01) |

(52) U.S. Cl.
CPC ..... *G02B 26/0816* (2013.01); *G02B 26/0875* (2013.01); *H02K 7/003* (2013.01); *H02K 7/02* (2013.01); *H02K 7/085* (2013.01); *H02K 7/14* (2013.01); *H02K 21/22* (2013.01); *G02B 26/105* (2013.01); *H02K 1/2793* (2013.01)

(58) Field of Classification Search
CPC ............ G02B 26/0816; G02B 26/0875; G02B 26/105; H02K 7/02; H02K 7/085; H02K 7/003; H02K 1/2793; H02K 21/22; H02K 7/14
USPC ..................................................... 359/221.4
See application file for complete search history.

(56) References Cited

U.S. PATENT DOCUMENTS 5,184,245 A * 2/1993 Murakami ........... G02B 7/1821
359/196.1
2016/0359391 A1 12/2016 Sekii et al.

FOREIGN PATENT DOCUMENTS

JP 7-14417 U 3/1995

\* cited by examiner

*Primary Examiner* — Euncha P Cherry
(74) *Attorney, Agent, or Firm* — Keating & Bennett

(57) ABSTRACT

This rotary drive apparatus is arranged to cause incoming light coming from a light source to be emitted to an outside while changing the direction of the incoming light, and includes a motor including a hollow shaft arranged to extend along a central axis extending in a vertical direction, the hollow shaft including a through hole arranged to pass therethrough in an axial direction; a flywheel including at least one optical component arranged to reflect the incoming light or allow the incoming light to pass therethrough; and a laser module including the light source. At least a portion of the laser module is arranged below the base portion arranged to directly or indirectly support a stator. The through hole defines a light path along which the incoming light travels.

17 Claims, 7 Drawing Sheets

ROTARY DRIVE APPARATUS

CROSS REFERENCE TO RELATED APPLICATIONS

This application claims the benefit of priority to Japanese Patent Application No. 2017-107202 filed on May 30, 2017. The entire contents of this application are hereby incorporated herein by reference.

BACKGROUND OF THE INVENTION

1. Field of the Invention

The present invention relates to a rotary drive apparatus.

2. Description of the Related Art

A known scanner apparatus used for position recognition in a head-mounted display (HMD) or the like typically has installed therein a flywheel arranged to emit light coming from a light source to a surrounding space while changing the direction of the light so that the light will impinge on a target object, and a motor arranged to rotatably support the flywheel. Such an apparatus arranged to support a flywheel and an optical component to change the direction of light coming from a light source is described in, for example, JP-A 2016-226227.

SUMMARY OF THE INVENTION

A motor described in JP-A 2016-226227 has the flywheel installed in an upper portion thereof. If the light source were to be installed above the flywheel, the light source could not be installed on the flywheel, and a dedicated member to fix the light source would be required. This is because, if the light source were installed on the flywheel, which is a portion of a rotating portion of the motor, a wire drawn out from the light source might get tangled up during rotation of the motor. Further, if the dedicated member with the light source installed thereon and a rotary drive apparatus were to be unified, a portion of the dedicated member would overlap with the flywheel when viewed in a radial direction. If this happened, the dedicated member might interfere with travel of light emitted from the flywheel to make it impossible for light to be emitted from the flywheel in all directions to a surrounding space.

The present invention has been conceived to provide a rotary drive apparatus arranged to cause light emitted from a light source to be emitted to an outside while changing the direction of the light, the rotary drive apparatus being capable of causing light to be emitted from a flywheel in all directions to a surrounding space without the need for a separate dedicated member to fix the light source.

A rotary drive apparatus according to a preferred embodiment of the present invention is arranged to cause incoming light coming from a light source to be emitted to an outside while changing the direction of the incoming light, and includes a motor including a hollow shaft arranged to extend along a central axis extending in a vertical direction, the hollow shaft including a through hole arranged to pass therethrough in an axial direction; a flywheel including at least one optical component arranged to reflect the incoming light or allow the incoming light to pass therethrough; and a laser module including the light source. The motor includes a stationary portion including a stator; and a rotating portion supported through a bearing portion to be rotatable about the central axis with respect to the stationary portion, the rotating portion including a magnet arranged opposite to the stator. The stationary portion includes a base portion arranged to directly or indirectly support the stator. At least a portion of the laser module is arranged below the base portion. The through hole defines a light path along which the incoming light travels. The flywheel is supported by the rotating portion.

According to the above preferred embodiment of the present invention, the incoming light coming from the light source of the laser module, at least a portion of which is arranged below the base portion, travels through the through hole of the hollow shaft of the motor, and is emitted to the outside through the flywheel supported by the rotating portion. This allows light to be emitted from the flywheel in all directions to a surrounding space without the need for a separate dedicated member to fix the light source.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor, which will be described below, is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a flywheel is arranged with respect to the motor is defined as an upper side. The shape of each member or portion and relative positions of different members or portions will be described based on the above assumptions. It should be noted, however, that the above definitions of the vertical direction and the upper side are not meant to restrict in any way the orientation of a rotary drive apparatus according to any preferred embodiment of the present invention when in use. Also note that the term "parallel" as used herein includes both "parallel" and "substantially parallel". Also note that the term "perpendicular" as used herein includes both "perpendicular" and "substantially perpendicular".

Figure 1:
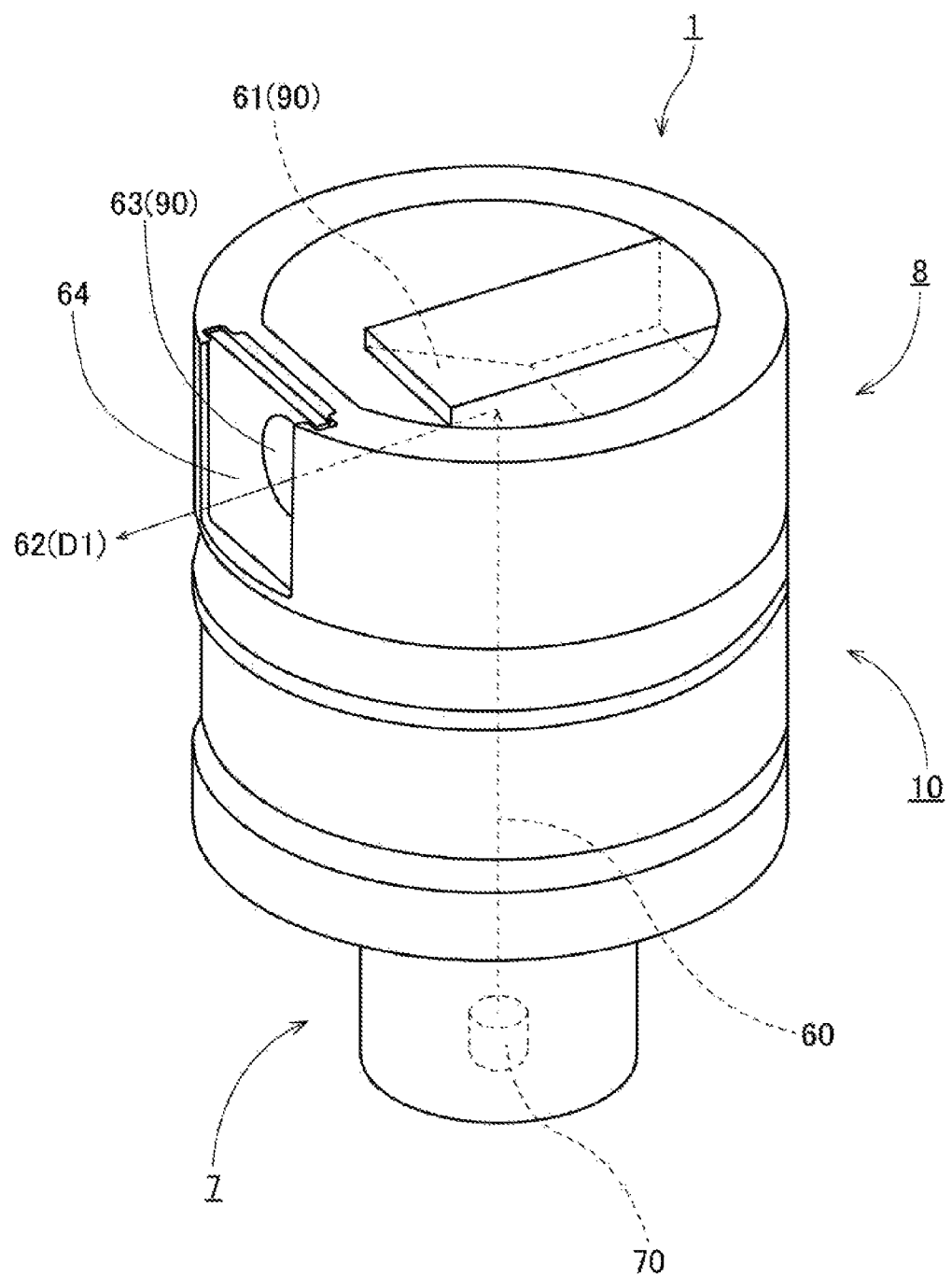
FIG. 1 is a perspective view of a rotary drive apparatus according to a first preferred embodiment of the present invention.

FIG. 1 is a perspective view of a rotary drive apparatus 1 according to a first preferred embodiment of the present invention. The rotary drive apparatus 1 is an apparatus arranged to cause incoming light 60 coming from a light source 70 to be emitted to an outside of the rotary drive apparatus 1 while changing the direction of the incoming light 60. A laser module 7, which includes the light source 70, is arranged in a lower portion of the rotary drive apparatus 1. The incoming light 60, which travels upward along a central axis 9 extending in a vertical direction of a motor 10, is emitted from the light source 70.

Referring to FIG. 1, the rotary drive apparatus 1 includes the motor 10, the laser module 7, and a flywheel 8.

Figure 2:
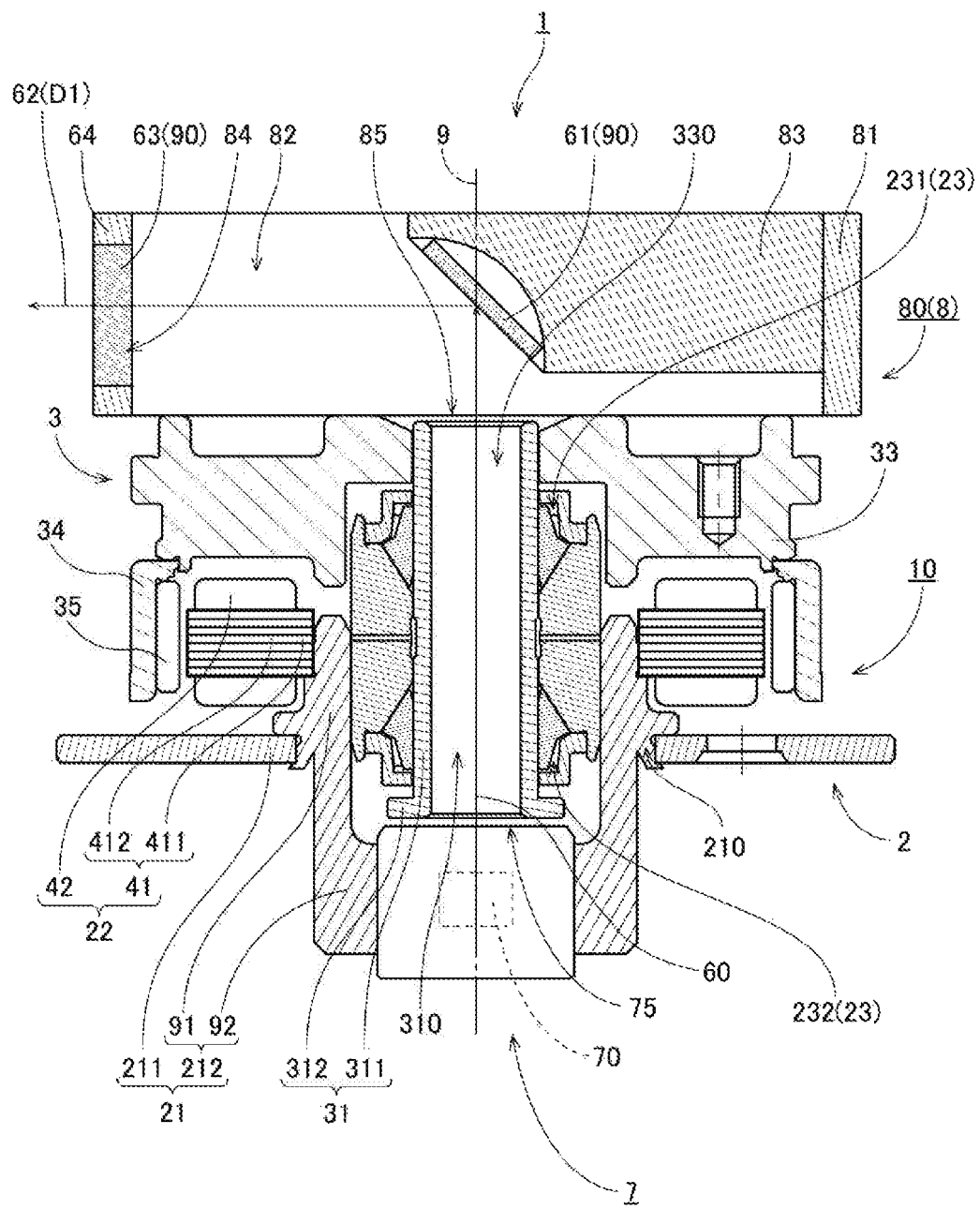
FIG. 2 is a vertical sectional view of the rotary drive apparatus according to the first preferred embodiment.
Figure 3:
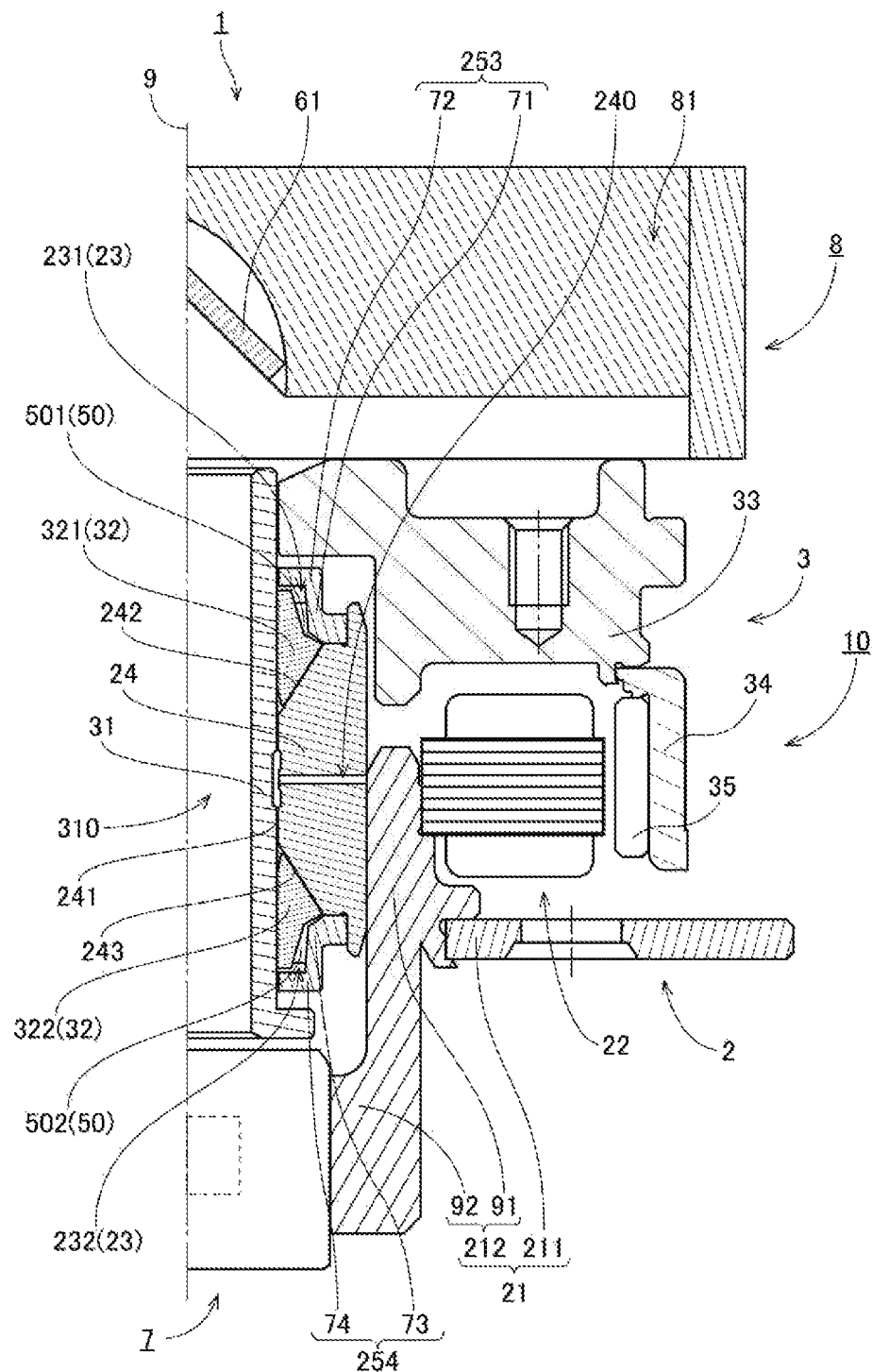
FIG. 3 is a partial vertical sectional view of the rotary drive apparatus according to the first preferred embodiment.

Next, the structure of the motor 10 will now be described in more detail below. FIG. 2 is a vertical sectional view of the rotary drive apparatus 1 according to the first preferred embodiment. Referring to FIG. 2, the motor 10 includes a stationary portion 2 and a rotating portion 3. The stationary portion 2 is arranged to be stationary relative to a casing or the like (not shown) in which the rotary drive apparatus 1 is arranged. The rotating portion 3 is supported through a bearing portion 23, which will be described below, to be rotatable about the central axis 9 with respect to the stationary portion 2. FIG. 3 is a partial vertical sectional view of the rotary drive apparatus 1 according to the first preferred embodiment. The following description will be made with reference to FIGS. 1 to 3 appropriately.

The stationary portion 2 according to the present preferred embodiment includes a base portion 21, a stator 22, and the bearing portion 23, which will be described below.

The base portion 21 is arranged to support the stator 22, which will be described below. The base portion 21 includes a base body 211 and a stator holder 212.

The base body 211 is a plate-shaped member arranged to support the stator holder 212. A metal, such as, for example, an aluminum alloy or stainless steel, is used as a material of the base body 211. The base body 211 is arranged to extend radially outward from an outer circumference of the stator holder 212. When the motor 10 is used, the base body 211 is, for example, fixed to the casing or the like in which the rotary drive apparatus 1 is arranged through screws or the like. Note that a circuit board (not shown), which is arranged to supply electric drive currents to the motor 10, may be arranged on or embedded in an upper surface or a lower surface of the base body 211.

The stator holder 212 is a cylindrical member arranged to extend in the axial direction. The stator holder 212 includes an outer circumferential surface to which the stator 22 is fixed above the base body 211. The stator holder 212 is inserted in a through hole 210 of the base body 211, and is fixed to the base body 211 by crimping. Note, however, that the stator holder 212 may alternatively be fixed to the base body 211 by another method, such as, for example, welding. Also note that the base body 211 and the stator holder 212 may alternatively be defined by a single continuous monolithic member.

In the present preferred embodiment, the stator holder 212 includes a holder body 91 and a module holding portion 92. The holder body 91 is a cylindrical portion including an upper portion to which the stator 22 is fixed, and the holder body 91 is arranged to extend axially downward beyond the base body 211. The module holding portion 92 is arranged to extend radially inward from the holder body 91. At least a portion of the laser module 7, which will be described below, is arranged below the base portion 21 and radially inside of the module holding portion 92 of the stator holder 212. In addition, at least a portion of an outer circumferential surface of the laser module 7 is fixed to an inner circumferential surface of the module holding portion 92. This leads to a reduced cost, without the need to provide a separate dedicated member to fix the laser module 7, which includes the light source 70, which will be described below. Further, a reduced axial dimension of the rotary drive apparatus 1 as a whole, which includes the laser module 7, can be achieved.

The stator 22 is an armature including a stator core 41 and a plurality of coils 42. The stator 22 is arranged above at least a portion of the base portion 21. The stator core 41 is defined by, for example, laminated steel sheets, that is, electromagnetic steel sheets, such as silicon steel sheets, placed one upon another in the axial direction. The stator core 41 is directly supported by the base portion 21 by being fixed to an outer circumferential surface of the stator holder 212 through, for example, an adhesive. Note that the stator 22 may alternatively be indirectly supported by the base portion 21 with another member (not shown) interposed therebetween.

In addition, the stator core 41 includes a core back 411 in the shape of a circular ring, and a plurality of teeth 412 arranged to project radially outward from the core back 411. The coils 42 are a collection of conducting wires wound around the teeth 412. The electric drive currents for the motor 10 are supplied from an external power supply (not shown) to the coils 42 through the aforementioned circuit board and the conducting wires. The teeth 412 and the coils 42 are preferably arranged in the form of a circular ring and at substantially regular intervals in a circumferential direction about the central axis 9.

Referring to FIG. 3, the bearing portion 23 includes a sleeve portion 24, a first cap 253, and a second cap 254. In addition, the bearing portion 23 is arranged to rotatably support a hollow shaft 31 of the rotating portion 3, which will be described below.

The sleeve portion 24 is arranged to extend in the axial direction to assume an annular shape around the hollow shaft 31, which will be described below. At least a portion of an outer circumferential surface of the sleeve portion 24 is inserted radially inside of the stator holder 212, and is fixed to an inner circumferential surface of the holder body 91 of the stator holder 212 through, for example, an adhesive. Thus, the base portion 21, the stator 22, the sleeve portion 24, the first cap 253, the second cap 254, and the laser module 7 are fixed to one another. Each of the first cap 253, the second cap 254, and the laser module 7 will be described below. An upper end portion of the sleeve portion 24 is arranged axially above an upper end portion of the stator holder 212 and an upper end portion of the stator 22. In addition, a lower end portion of the sleeve portion 24 is arranged axially below the stator 22. Note that the sleeve portion 24 may be defined by a plurality of members.

The first cap 253 is a member arranged to extend radially inward from the upper end portion of the sleeve portion 24. An upper end portion of the first cap 253 is arranged lower than an upper end portion of the hollow shaft 31, which will be described below. The first cap 253 includes a first tubular portion 71 and a first plate portion 72. The first tubular portion 71 is fixed to the sleeve portion 24 in the vicinity of the upper end portion of the sleeve portion 24, and is arranged to extend upward in the axial direction to assume an annular shape. The first plate portion 72 is arranged to extend radially inward from an upper end portion of the first tubular portion 71.

The second cap 254 is a member arranged to extend radially inward from the lower end portion of the sleeve portion 24. A lower end portion of the second cap 254 is arranged higher than a lower end portion of the hollow shaft 31, which will be described below. The second cap 254 includes a second tubular portion 73 and a second plate portion 74. The second tubular portion 73 is fixed to the sleeve portion 24 in the vicinity of the lower end portion of the sleeve portion 24, and is arranged to extend downward in the axial direction to assume an annular shape. The second plate portion 74 is arranged to extend radially inward from a lower end portion of the second tubular portion 73.

The structure of the bearing portion 23 will be described in detail later.

The rotating portion 3 according to the present preferred embodiment includes the hollow shaft 31, annular portions 32, a rotor hub portion 33, a yoke 34, and a magnet 35.

The hollow shaft 31 is a cylindrical member arranged to extend in the axial direction along the central axis 9 radially inside of the sleeve portion 24, the first cap 253, and the second cap 254. A through hole 310 passing through the hollow shaft 31 in the axial direction is defined around the central axis 9 radially inside of the hollow shaft 31. The through hole 310 defines a light path along which the incoming light 60 travels. An outer circumferential surface of the hollow shaft 31 and an inner circumferential surface 241 of the sleeve portion 24 are arranged radially opposite to each other with a slight gap therebetween.

A metal, such as, for example, stainless steel, is used as a material of the hollow shaft 31. The material of the hollow shaft 31 may be either magnetic or nonmagnetic. Note that the hollow shaft 31 and each of the annular portions 32, which will be described below, may be defined by a single monolithic member. The laser module 7, which will be described below, is arranged below the lower end portion of the hollow shaft 31, and is fixed to an inner circumferential surface of the stator holder 212.

The hollow shaft 31 includes a shaft body 311 and a shaft annular portion 312. The shaft body 311 is a cylindrical portion of the hollow shaft 31 arranged to extend along the central axis 9. The shaft annular portion 312 is a disk-shaped portion arranged to extend radially outward from a lower end portion of the shaft body 311. Note that the shaft body 311 and the shaft annular portion 312 may be defined either by a single monolithic member or by separate members. Also note that the hollow shaft 31 and the rotor hub portion 33, which will be described below, may be defined either by separate members or by a single monolithic member. Further, a lowermost surface of a lubricating oil 50, which will be described below, is arranged at a level higher than that of an upper surface of the shaft annular portion 312, and an upper surface of the laser module 7, which will be described below, is arranged at a level lower than that of a lower surface of the shaft annular portion 312. At least one surface of the lubricating oil 50 is arranged to overlap with the rotor hub portion 33 when viewed in a radial direction.

The annular portions 32 include a first annular portion 321 and a second annular portion 322. The first annular portion 321 is a member fixed to an outer circumferential surface of an upper portion of the hollow shaft 31, and arranged to project radially outward therefrom over the entire circumferential extent thereof. In addition, the second annular portion 322 is a member fixed to an outer circumferential surface of a lower portion of the hollow shaft 31, and arranged to project radially outward therefrom over the entire circumferential extent thereof.

An outer circumferential surface of a lower portion of the first annular portion 321 and an upper inclined surface 242 of the sleeve portion 24, which is included in an upper portion of the sleeve portion 24 and is inclined with respect to the axial direction, are arranged obliquely opposite to each other with a slight gap therebetween. In addition, an outer circumferential surface of an upper portion of the second annular portion 322 and a lower inclined surface 243 of the sleeve portion 24, which is included in a lower portion of the sleeve portion 24 and is inclined with respect to the axial direction, are arranged obliquely opposite to each other with a slight gap therebetween.

Further, an outer circumferential surface of an upper portion of the first annular portion 321 and an inner circumferential surface of the first tubular portion 71 of the first cap 253 are arranged radially opposite to each other with a slight gap therebetween. In addition, an outer circumferential surface of a lower portion of the second annular portion 322 and an inner circumferential surface of the second tubular portion 73 of the second cap 254 are arranged radially opposite to each other with a slight gap therebetween.

The rotor hub portion 33 is arranged to extend radially outward from a peripheral portion of the upper end portion of the hollow shaft 31 to assume an annular shape around the hollow shaft 31. A metal, such as an aluminum alloy or stainless steel, for example, is used as a material of the rotor hub portion 33. An outer circumferential surface of the upper end portion of the hollow shaft 31 is fixed to an inner circumferential surface of the rotor hub portion 33. Specifically, the upper end portion of the hollow shaft 31 is press fitted and fixed in a through hole 330 defined in a center of the rotor hub portion 33. Note that the upper end portion of the hollow shaft 31 may alternatively be fixed to the rotor hub portion 33 through adhesion, welding, screwing, or the like. The flywheel 8, which will be described below, is fixed to an upper portion of the rotor hub portion 33. Note that another member, such as, for example, an inertia member (not shown), may be additionally fixed to the rotor hub portion 33.

The yoke 34 is a cylindrical member fixed to a radial outside of the magnet 35, which will be described below, to hold the magnet 35. An outer circumferential surface of the magnet 35 is fixed to an inner circumferential surface of the yoke 34. The yoke 34 is arranged to be substantially coaxial with the central axis 9. An upper end portion of the yoke 34 is fixed to a lower portion of the rotor hub portion 33 through an adhesive or by crimping, for example. A ferromagnetic material, such as, for example, iron, is used as a material of the yoke 34. This contributes to preventing magnetic flux generated from the magnet 35, which will be described below, from escaping outward.

The magnet 35 is fixed to the inner circumferential surface of the yoke 34 through, for example, an adhesive. A permanent magnet in the shape of a circular ring is used as the magnet 35 according to the present preferred embodiment. The magnet 35 is cylindrical or substantially cylindrical, and is arranged radially outside of the stator 22. An inner circumferential surface of the magnet 35 is arranged radially opposite to a radially outer end surface of each of the teeth 412 of the stator 22 with a slight gap therebetween. In addition, the inner circumferential surface of the magnet 35 includes north and south poles arranged to alternate with each other in the circumferential direction. Note that a plurality of magnets may be used in place of the magnet 35 in the shape of a circular ring. In the case where the plurality of magnets are used, the magnets are arranged on the inner circumferential surface of the yoke 34 such that pole surfaces of the north poles and pole surfaces of the south poles alternate with each other in the circumferential direction. The magnet 35 according to the present preferred embodiment is indirectly fixed to the rotor hub portion 33 through the yoke 34 as described above. Note that the magnet 35 may alternatively be directly fixed to the rotor hub portion 33 without the yoke 34 intervening therebetween.

Once, in the motor 10 described above, the electric drive currents are supplied to the coils 42 through the aforementioned circuit board, magnetic flux is generated around each of the teeth 412. Then, interaction between the magnetic flux of the teeth 412 and magnetic flux of the magnet 35 produces a circumferential torque between the stationary portion 2 and the rotating portion 3, so that the rotating portion 3 is caused to rotate about the central axis 9 with respect to the stationary portion 2. In addition, the flywheel 8, which is fixed to an upper side of the rotor hub portion 33, is caused to rotate about the central axis 9 together with the rotating portion 3.

Next, the structure of a bearing mechanism according to the present preferred embodiment will now be described in detail below. The following description will be made with reference to FIGS. 1 to 3 appropriately.

As described above, the stationary portion 2, which includes the sleeve portion 24, the first cap 253, and the second cap 254, and the rotating portion 3, which includes the hollow shaft 31, the first annular portion 321, and the second annular portion 322, are arranged opposite to each other with a gap therebetween. In addition, the lubricating oil 50 is arranged in this gap. Further, the inner circumferential surface 241, the upper inclined surface 242, and the lower inclined surface 243 of the sleeve portion 24, each of which defines a portion of the gap, for example, include dynamic pressure grooves (not shown) defined therein. A fluid dynamic pressure is induced in the lubricating oil 50 by the dynamic pressure grooves (not shown) while the motor 10 is running. The rotating portion 3 is thus supported by the stationary portion 2, so that the rotating portion 3 can stably rotate. That is, in the present preferred embodiment, the bearing mechanism is defined by a combination of the sleeve portion 24, the first cap 253, and the second cap 254, which belong to the stationary portion 2, a combination of the hollow shaft 31, the first annular portion 321, and the second annular portion 322, which belong to the rotating portion 3, and the lubricating oil 50 arranged in the gap.

A polyolester oil or a diester oil, for example, is used as the lubricating oil 50. While the motor 10 is running, the rotating portion 3, which includes the hollow shaft 31, the first annular portion 321, and the second annular portion 322, rotates about the central axis 9 while being supported through the lubricating oil 50 to be rotatable with respect to the stationary portion 2, which includes the sleeve portion 24, the first cap 253, and the second cap 254.

The lubricating oil 50 is arranged to exist continuously in the gap between the outer circumferential surface of the upper portion of the first annular portion 321 and the inner circumferential surface of the first tubular portion 71 of the first cap 253, the gap between the outer circumferential surface of the lower portion of the first annular portion 321 and the upper inclined surface 242 of the sleeve portion 24, and a gap between the outer circumferential surface of the hollow shaft 31 and an upper portion of the inner circumferential surface 241 of the sleeve portion 24. In addition, the lubricating oil 50 is arranged to exist continuously in a gap between the outer circumferential surface of the hollow shaft 31 and a lower portion of the inner circumferential surface 241 of the sleeve portion 24, the gap between the outer circumferential surface of the upper portion of the second annular portion 322 and the lower inclined surface 243 of the sleeve portion 24, and the gap between the outer circumferential surface of the lower portion of the second annular portion 322 and the inner circumferential surface of the second tubular portion 73 of the second cap 254. Note that a gap between the outer circumferential surface of the hollow shaft 31 and an axial middle portion of the inner circumferential surface 241 of the sleeve portion 24 is a space where no lubricating oil 50 exists.

As described above, the bearing mechanism according to the present preferred embodiment has a so-called partially-filled structure, in which the lubricating oil 50 exists at two separate locations, i.e., upper and lower locations. The lubricating oil 50 includes an upper lubricating oil 501 arranged to exist above an axial middle portion of the sleeve portion 24, and a lower lubricating oil 502 arranged to exist below the axial middle portion of the sleeve portion 24.

That is, the bearing mechanism according to the present preferred embodiment includes an upper bearing portion 231 and a lower bearing portion 232 provided separately. The upper bearing portion 231 is defined by members of the stationary portion 2 which include the first cap 253 and a portion of the sleeve portion 24 above the axial middle portion of the sleeve portion 24, members of the rotating portion 3 which include the first annular portion 321 and a portion of the hollow shaft 31 above an axial middle portion of the hollow shaft 31, and the upper lubricating oil 501. Meanwhile, the lower bearing portion 232 is defined by members of the stationary portion 2 which include the second cap 254 and a portion of the sleeve portion 24 below the axial middle portion of the sleeve portion 24, members of the rotating portion 3 which include the second annular portion 322 and a portion of the hollow shaft 31 below the axial middle portion of the hollow shaft 31, and the lower lubricating oil 502.

An upper surface of the upper lubricating oil 501 is arranged to overlap with the first tubular portion 71 of the first cap 253 when viewed in a radial direction. In addition, a lower surface of the lower lubricating oil 502 is arranged to overlap with the second tubular portion 73 of the second cap 254 when viewed in the radial direction. Further, a labyrinth structure having a complicated spatial structure is provided between the lower surface of the lower lubricating oil 502 and a through hole 75 defined in the upper surface of the laser module 7, which will be described below. This reduces the likelihood that the lower lubricating oil 502 will evaporate and enter into the laser module 7 through the through hole 75 even when the lower surface of the lower lubricating oil 502 lies near an upper end portion of the laser module 7. In addition, the sleeve portion 24 further includes a sleeve through hole 240 arranged to pass through the sleeve portion 24 in the radial direction below the first cap 253 and above the second cap 254. This brings air in the gap where the stationary portion 2 and the rotating portion 3 are opposed to each other into communication with an exterior space through the sleeve through hole 240, so that a pressure in the vicinity of the upper surface of the upper lubricating oil 501 and a pressure in the vicinity of the lower surface of the lower lubricating oil 502 become substantially equal to each other. This leads to a prevention of a leakage of each of the upper lubricating oil 501 and the lower lubricating oil 502 due to a pressure difference.

Note that the bearing mechanism may alternatively be arranged to have a so-called full-fill structure, in which the lubricating oil 50 is arranged to exist continuously in the gap between the outer circumferential surface of the upper portion of the first annular portion 321 and the inner circumferential surface of the first tubular portion 71 of the first cap 253, the gap between the outer circumferential surface of the lower portion of the first annular portion 321 and the upper inclined surface 242 of the sleeve portion 24, the gap between the outer circumferential surface of the hollow shaft 31 and the inner circumferential surface 241 of the sleeve portion 24, the gap between the outer circumferential surface of the upper portion of the second annular portion 322 and the lower inclined surface 243 of the sleeve portion 24, and the gap between the outer circumferential surface of the lower portion of the second annular portion 322 and the inner circumferential surface of the second tubular portion 73 of the second cap 254, that is, in the gap where the stationary portion 2 and the rotating portion 3 are opposed to each other. This reduces the likelihood that a shock applied to the motor 10 during rotation thereof would cause a contact between the rotating portion 3 and the stationary portion 2.

Figure 4:
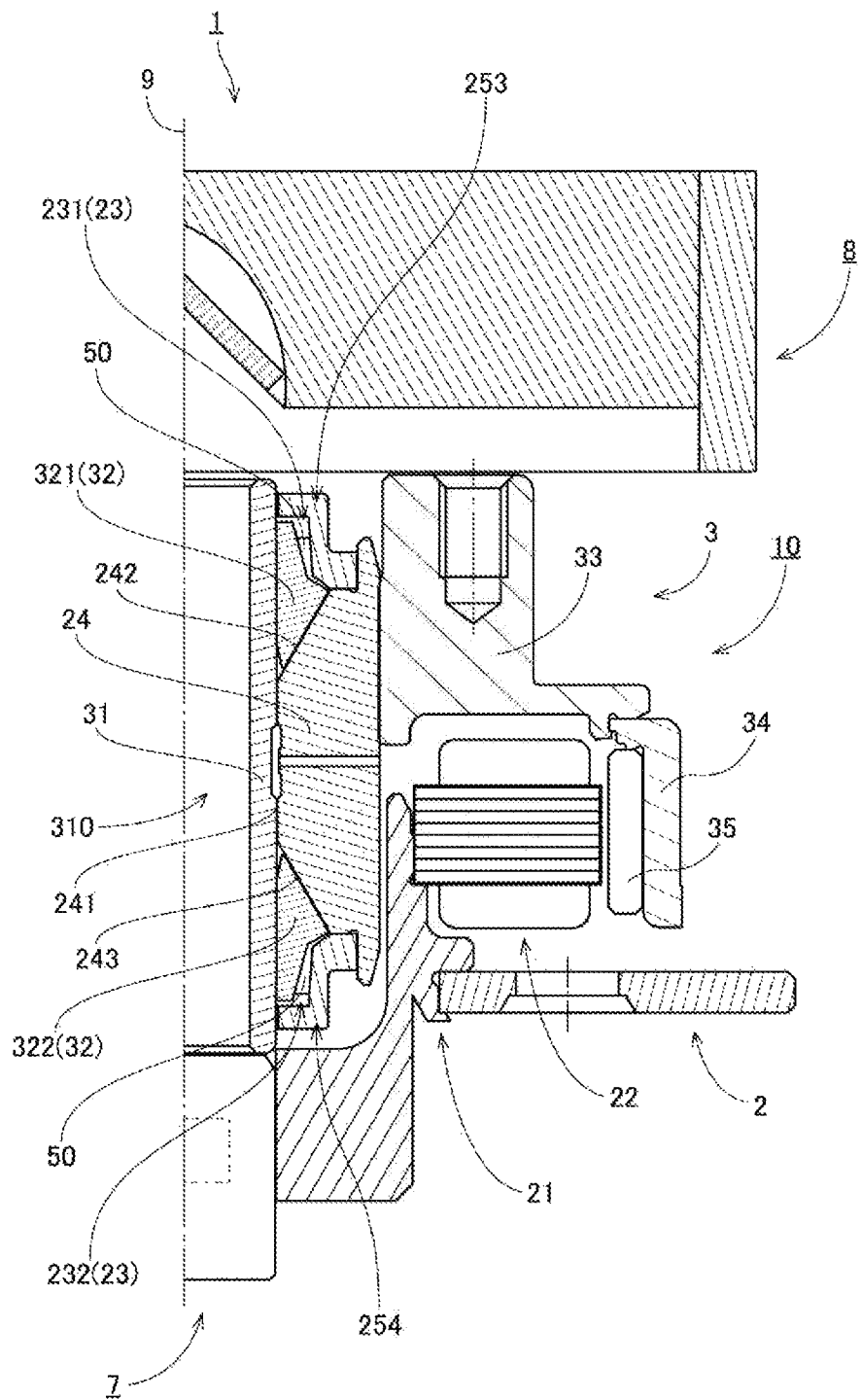
FIG. 4 is a partial vertical sectional view of a rotary drive apparatus according to a modification of the first preferred embodiment.

Further, referring to FIG. 4, in a modification of the first preferred embodiment, a hollow shaft 31 and annular portions 32 may be included in a stationary portion 2, while a bearing portion 23 including a sleeve portion 24, a first cap 253, and a second cap 254 may be included in a rotating portion 3.

In the modification illustrated in FIG. 4, a rotor hub portion 33 is arranged to extend radially outward from an outer circumference of the sleeve portion 24 to assume an annular shape. In addition, at least a portion of an outer circumferential surface of the sleeve portion 24 is inserted radially inside of the rotor hub portion 33, and is fixed to the rotor hub portion 33 through, for example, an adhesive. Further, an upper portion of a laser module 7, which will be described below, is fixed to a lower portion of the hollow shaft 31. Thus, a base portion 21, a stator 22, the hollow shaft 31, the annular portions 32, and the laser module 7, which will be described below, are fixed to one another. Furthermore, a flywheel 8, which will be described below, is fixed to an upper portion of the rotor hub portion 33. In addition, a magnet 35 is indirectly fixed to a radially outer portion of a lower portion of the rotor hub portion 33 with a yoke 34 interposed therebetween. An upper end portion of the hollow shaft 31 is arranged axially below an upper end portion of the rotor hub portion 33. Thus, the flywheel 8, which will be described below, is supported only by the upper end portion of the rotor hub portion 33, and is not in contact with the upper end portion of the hollow shaft 31.

The stationary portion 2, which includes the hollow shaft 31, a first annular portion 321, and a second annular portion 322, and the rotating portion 3, which includes the sleeve portion 24, the first cap 253, and the second cap 254, are arranged opposite to each other with a gap therebetween. In addition, a lubricating oil 50 is arranged in this gap. Further, an inner circumferential surface 241, an upper inclined surface 242, and a lower inclined surface 243 of the sleeve portion 24, for example, include dynamic pressure grooves (not shown) defined therein. Note, however, that the dynamic pressure groove(s) (not shown) may alternatively be defined in any other desirable places. A fluid dynamic pressure is induced in the lubricating oil 50 by the dynamic pressure grooves (not shown) while a motor 10 is running. The rotating portion 3 is thus supported by the stationary portion 2, so that the rotating portion 3 can stably rotate. That is, a bearing mechanism according to the present modification is defined by a combination of the hollow shaft 31, the first annular portion 321, and the second annular portion 322, which belong to the stationary portion 2, a combination of the sleeve portion 24, the first cap 253, and the second cap 254, which belong to the rotating portion 3, and the lubricating oil 50 arranged in the gap. While the motor 10 is running, the flywheel 8 and the rotating portion 3, which includes the sleeve portion 24, the first cap 253, and the second cap 254, rotate about a central axis 9 while being supported through the lubricating oil 50 to be rotatable with respect to the laser module 7, which will be described below, and the stationary portion 2, which includes the hollow shaft 31, the first annular portion 321, and the second annular portion 322.

As described above, the flywheel 8 according to the present preferred embodiment is arranged to cause the incoming light 60 emitted from the light source 70 to be emitted to the outside while changing the direction of the incoming light 60. In addition, the rotating portion 3 of the motor 10, which is arranged to support the flywheel 8, is rotatably supported through the bearing portion 23, which defines a portion of a fluid dynamic bearing. Thus, a vibration that is generated from the motor 10 while the rotary drive apparatus 1 is running is not easily transferred to the flywheel 8. This contributes to preventing the flywheel 8 from vibrating to affect a light beam emitted out of the flywheel 8. Thus, the light beam can be emitted to an outside of the flywheel 8 with high accuracy.

Next, the structure of the laser module 7 will now be described below. The following description will be made with reference to FIGS. 1 to 4 appropriately.

The laser module 7 is a light transmitter containing the light source 70. In the present preferred embodiment, at least a portion of the laser module 7 is arranged radially inside of the base portion 21. In addition, at least a portion of the laser module 7 is fixed to the inner circumferential surface of the module holding portion 92 of the stator holder 212. Further, in the present preferred embodiment, the laser module 7 is fixed to the base portion 21, and the incoming light 60 emitted from the light source 70 travels through the through hole 310 of the hollow shaft 31, and is emitted to the outside while being changed in direction in the flywheel 8 above the hollow shaft 31. Thus, a larger area can be irradiated with the light emitted from the flywheel 8 than, for example, in the case where a dedicated member to fix the laser module 7 is separately provided so as to cover an exterior of the flywheel 8.

Further, in the present preferred embodiment, at least a portion of the laser module 7 is fitted and fixed to the inner circumferential surface of the stator holder 212 of the base portion 21. Thus, a lower cost and higher workability in assembling the rotary drive apparatus 1 can be achieved than in the case where a dedicated member separate from the stator holder 212 is used to fix at least a portion of the laser module 7. In addition, the possibility that the dedicated member would interfere with the travel of the light emitted from the flywheel 8, which might occur if the dedicated member were separately provided, can be eliminated. Note that an outer circumferential surface of at least a portion of the laser module 7, including the upper end portion of the laser module 7, may be fixed to an inner circumferential surface of at least a portion of the module holding portion 92 through, for example, adhesion, press fitting, or screwing. In other words, the rotary drive apparatus 1 may further include one of an adhesion portion, a press fit portion, and a screwing portion arranged to fix the base portion 21 and at least a portion of the laser module 7 to each other.

The laser module 7 includes, around the light source 70 therein, a light-transmitting member (not shown) made of a material containing, for example, glass, acrylic, polycarbonate, or the like. Thus, the light path along which the incoming light 60 emitted from the light source 70 travels is defined around the light source 70.

As described above, the incoming light 60 emitted from the light source 70 travels upward along the central axis 9 of the motor 10. The through hole 75 is defined in the upper surface of the laser module 7. The through hole 75 is arranged to pass through a portion or a whole of the upper surface of the laser module 7 in the axial direction, the through hole 75 extending on and around the central axis 9. The incoming light 60 passes through the light-transmitting member within the laser module 7, the through hole 75, and the through hole 310 of the hollow shaft 31, and travels further upward.

Next, the structure of the flywheel 8 will now be described below. The following description will be made with reference to FIGS. 1 to 4 appropriately.

The flywheel 8 is arranged above the motor 10, and is supported by an upper end portion of the rotating portion 3 of the motor 10. The flywheel 8 is fixed to an upper surface of the rotor hub portion 33 of the rotating portion 3 through, for example, engagement, an adhesive, or the like. In addition, the flywheel 8 is arranged to rotate about the central axis 9 together with the rotating portion 3. The flywheel 8 includes a main body 80 and optical components 90 each of which is arranged to reflect the incoming light 60 or allow the incoming light 60 to pass therethrough. The optical components 90 include a mirror 61 and a lens 63. The main body 80 is arranged to support each of the mirror 61 and the lens 63. A resin, for example, is used as a material of the main body 80. Glass, for example, is used as materials of the mirror 61 and the lens 63. The glass is not limited to particular types of glass. For example, organic glass, inorganic glass, a resin, a metal, or other materials may be used as the materials of the mirror 61 and the lens 63.

The mirror 61 is arranged to have a rectangular or circular external shape. The mirror 61 is fixed to a resin member of a mirror support portion 83 of the main body 80, which will be described below, and at least a portion of the mirror 61 is arranged on the central axis 9. In addition, a reflecting surface of the mirror 61 is inclined at an angle of 45 degrees with respect to the axial direction and a first radial direction D1. The incoming light 60 impinges on a central portion of the mirror 61. The central portion of the mirror 61 refers to the entire mirror 61, excluding a peripheral portion of the mirror 61. A fully reflective mirror, for example, is used as the mirror 61. The incoming light 60 is reflected by the mirror 61 inside of the flywheel 8, and is changed in direction. Note that, instead of the mirror 61, a prism (not shown) or the like may alternatively be used to change the direction of the incoming light 60.

The lens 63 is arranged to have a rectangular or circular external shape. The lens 63 is fixed in a through hole 84, which is arranged to pass through a tubular portion 81 of the main body 80 in the first radial direction D1, through, for example, adhesion or engagement through a lens frame 64 arranged to be in contact with at least a portion of a peripheral portion of the lens 63. Note that the lens 63 may alternatively be directly fixed to the main body 80 without the intervention of the lens frame 64. In addition, the lens 63 is arranged at right angles to the first radial direction D1, that is, in parallel with the central axis 9, in a state in which the lens 63 is fixed to the main body 80. The incoming light 60 is caused by the mirror 61 to change in direction inside of the flywheel 8, and passes through a central portion of the lens 63 to be emitted to the outside of the flywheel 8. The central portion of the lens 63 refers to the entire lens 63, excluding the peripheral portion of the lens 63.

The main body 80 includes the tubular portion 81, a hollow portion 82, and the mirror support portion 83. The tubular portion 81 is a cylindrical member arranged to extend along the central axis 9. The hollow portion 82 is a cavity defined inside of the main body 80. The mirror support portion 83 is arranged to extend radially inward from an inner circumferential surface of the tubular portion 81. The mirror 61 is fixed to the mirror support portion 83 around the central axis 9. Further, a through hole 85 is defined in a lower surface of the main body 80. The through hole 85 is arranged to pass through a portion or a whole of the lower surface of the main body 80 in the axial direction, the through hole 85 extending on and around the central axis 9.

The incoming light 60 emitted from the light source 70 travels upward through the through hole 75 of the laser module 7. Further, the incoming light 60 passes through the through hole 310 of the hollow shaft 31 of the motor 10 and the through hole 85 defined in a lower surface of the flywheel 8, and travels upward along the central axis 9 in the hollow portion 82. Then, the incoming light 60 is reflected by the mirror 61 to become reflected light 62. The reflected light 62 further travels in the first radial direction D1 in the hollow portion 82, and is emitted to the outside of the rotary drive apparatus 1 through the lens 63 fitted in the tubular portion 81. Thus, the possibility that the dedicated member would interfere with the travel of the light emitted from the flywheel 8, which might occur if the dedicated member were separately provided to fix the laser module 7 including the light source 70, can be eliminated.

The mirror 61 of the flywheel 8 is arranged to reflect the incoming light 60 coming from the light source 70 and emit the reflected light 62 to the outside of the rotary drive apparatus 1 while rotating about the central axis 9 together with the rotating portion 3 of the motor 10. Thus, a wide range can be irradiated with light. Note that the rotation speed of the rotary drive apparatus 1 can be recognized by sensing the reflected light 62, which is emitted out of the flywheel 8, using an external sensor (not shown). Note that an outer circumferential surface of the main body 80 has a reflectivity lower than that of a front surface of the mirror 61. This contributes to preventing diffuse reflection of the incoming light 60 coming from the light source 70.

Note that the rotary drive apparatus 1 may further include, in addition to the flywheel 8 arranged to emit the reflected light 62 to the outside in the first radial direction D1, another flywheel (not shown) which is arranged to emit reflected light to the outside in a second radial direction different from the first radial direction D1, and which is arranged, for example, above the flywheel 8. In this case, a half mirror the transmissivity and reflectivity of which are substantially equal is used as the mirror 61. Then, a half of the incoming light 60 which impinges on the mirror 61 in the flywheel 8 is reflected in the first radial direction D1 to be emitted to the outside. In addition, a remaining half of the incoming light 60 which impinges on the mirror 61 is allowed to pass through the mirror 61 and travel further upward. Then, in the other flywheel arranged above the flywheel 8, all the remaining half of the incoming light 60 is reflected in the second radial direction, using a fully reflective mirror (not shown), to be emitted to the outside. Note that a plurality of mirrors (not shown), including a half mirror, which are arranged to reflect the incoming light 60 in mutually different directions may alternatively be installed in the single flywheel 8 of the rotary drive apparatus 1.

When light is emitted out in the two different directions, i.e., the first radial direction D1 and the second radial direction, as described above, light beams that are emitted out in the two different directions take different times to reach an object to be irradiated with light while the motor 10 is running, and this makes it possible to precisely recognize the three-dimensional position of the object in a space. Note that the other flywheel may alternatively be arranged in a rotary drive apparatus (not shown) other than the rotary drive apparatus 1 including the flywheel 8.

While preferred embodiments of the present invention have been described above, it is to be understood that the present invention is not limited to the above-described preferred embodiments.

Figure 5:
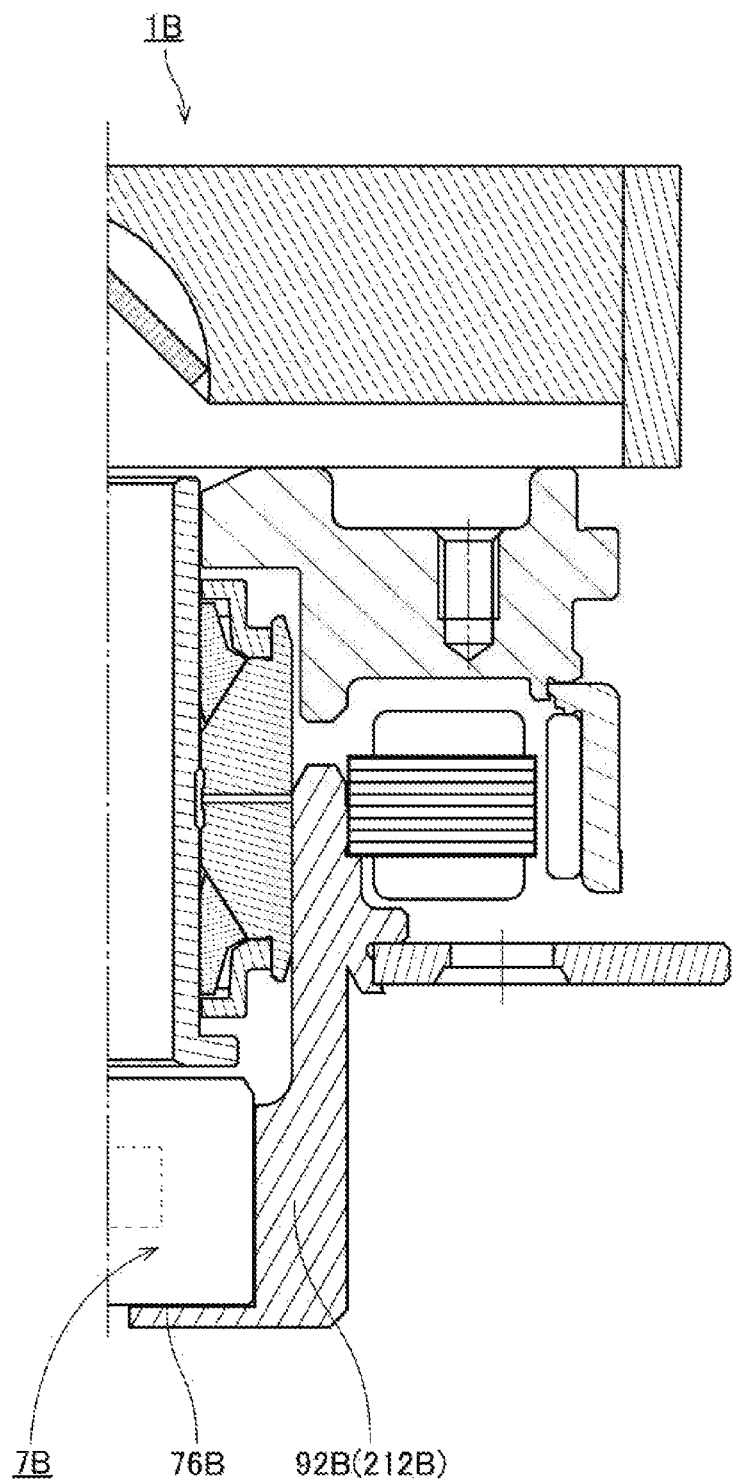
FIG. 5 is a partial vertical sectional view of a rotary drive apparatus according to another modification of the first preferred embodiment.

FIG. 5 is a partial vertical sectional view of a rotary drive apparatus 1B according to a modification of the first preferred embodiment. In the modification illustrated in FIG. 5, at least a portion (i.e., a portion 76B in FIG. 5) of a lower surface of a laser module 7B is covered with a module holding portion 92B of a stator holder 212B. The laser module 7B is thus more securely held.

Figure 6:
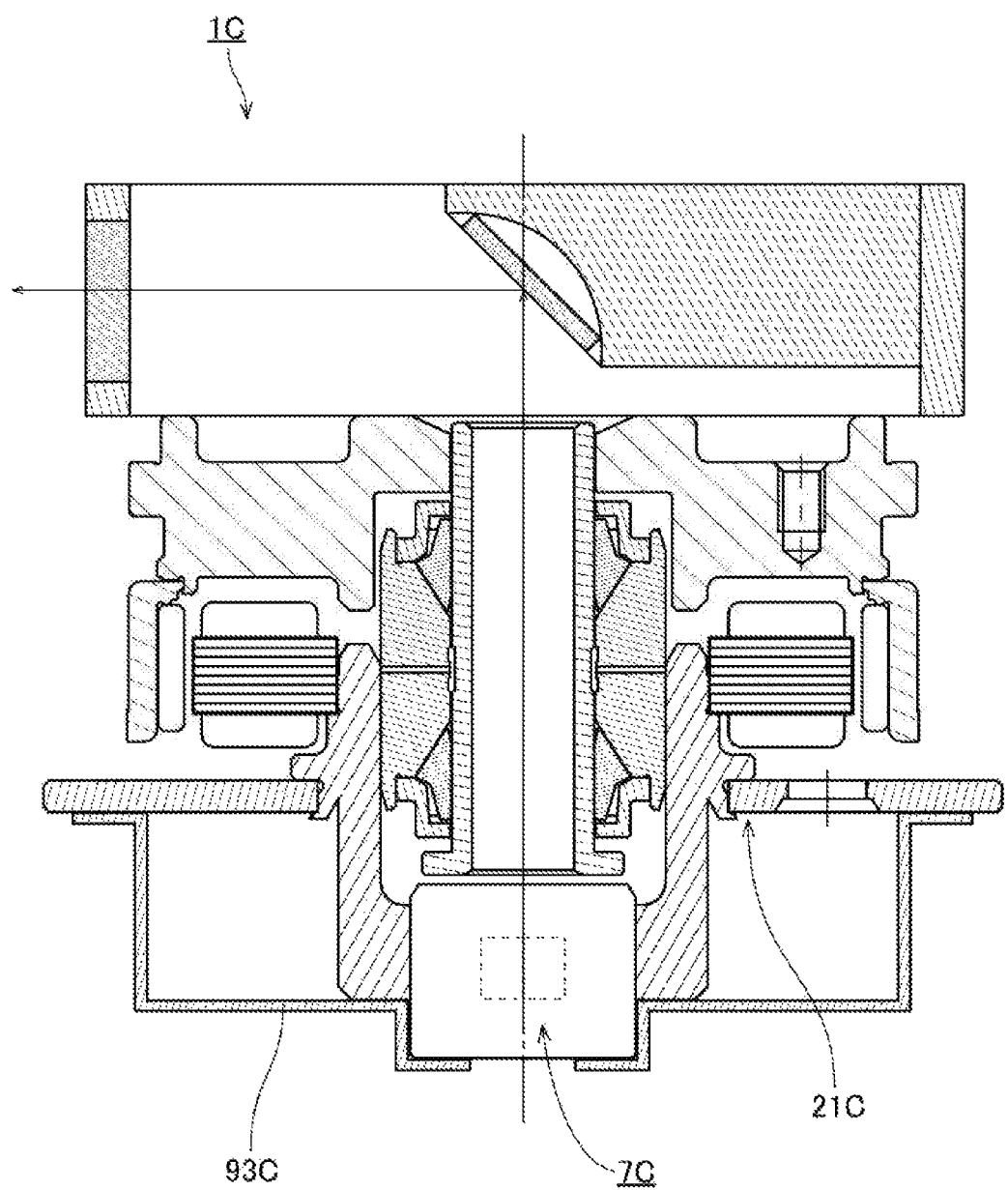
FIG. 6 is a vertical sectional view of a rotary drive apparatus according to yet another modification of the first preferred embodiment.

FIG. 6 is a vertical sectional view of a rotary drive apparatus 1C according to another modification of the first preferred embodiment. In the modification illustrated in FIG. 6, the rotary drive apparatus 1C includes a module holding cap 93C, which is provided separately from a base portion 21C, and which is arranged to cover at least a portion of at least one of a lower surface and a side surface of a laser module 7C. The module holding cap 93C is fixed to at least a portion of the base portion 21C through, for example, adhesion, press fitting, or screwing. The laser module 7C is thus more securely held.

Figure 7:
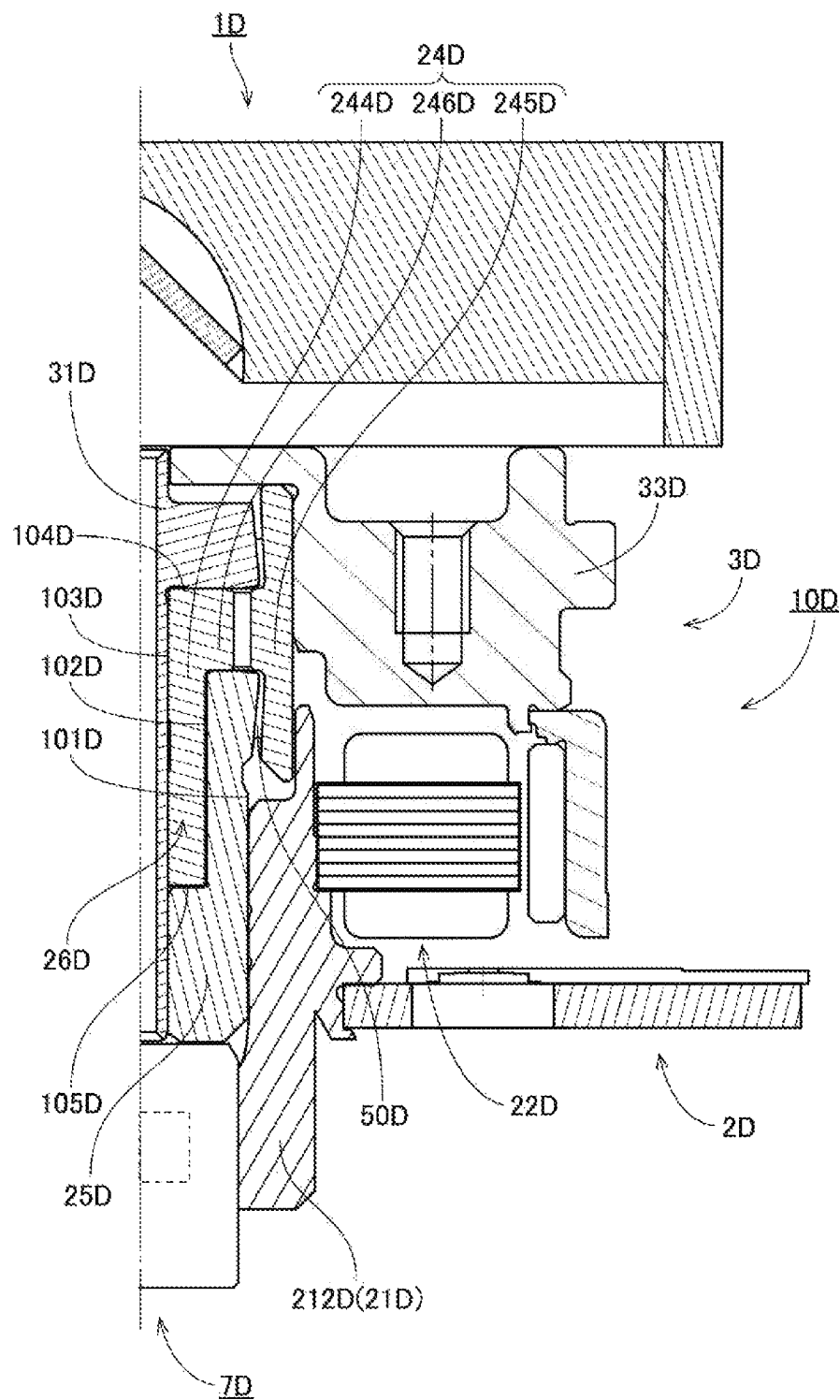
FIG. 7 is a partial vertical sectional view of a rotary drive apparatus according to yet another modification of the first preferred embodiment.

FIG. 7 is a partial vertical sectional view of a rotary drive apparatus 1D according to yet another modification of the first preferred embodiment. In the modification illustrated in FIG. 7, a motor 10D includes a stationary portion 2D including a hollow shaft 31D and a cap 25D, and a rotating portion 3D including a sleeve portion 24D. The stationary portion 2D and the rotating portion 3D are different in structure from the stationary portion 2 and the rotating portion 3, respectively, according to the above-described first preferred embodiment. A lower portion of an outer circumferential surface 101D of the cap 25D is fixed to an inner circumferential surface of a stator holder 212D of a base portion 21D, to which a stator 22D is fixed. In addition, a lower portion of an inner circumferential surface 102D of the cap 25D is fixed to an outer circumferential surface 103D of the hollow shaft 31D. Further, an upper portion of a laser module 7D is fixed to a lower portion of the hollow shaft 31D. Thus, the base portion 21D, the stator 22D, the cap 25D, the hollow shaft 31D, and the laser module 7D are fixed to one another. Further, an upper portion of the inner circumferential surface 102D of the cap 25D is arranged radially opposite to the outer circumferential surface 103D of the hollow shaft 31D with a gap 26D therebetween. A sleeve inner portion 244D, which will be described below, is arranged in the gap 26D. In addition, a rotor hub portion 33D is fixed to an upper portion of an outer circumferential surface of the sleeve portion 24D.

The sleeve portion 24D includes the sleeve inner portion 244D, a sleeve outer portion 245D, and a sleeve joining portion 246D. The sleeve inner portion 244D is a radially innermost portion of the sleeve portion 24D, and is arranged to extend in the axial direction to assume an annular shape.

The sleeve outer portion 245D is a radially outermost portion of the sleeve portion 24D, and is arranged to extend in the axial direction to assume an annular shape. The sleeve joining portion 246D is a portion arranged to extend radially to join the sleeve inner portion 244D and the sleeve outer portion 245D to each other. The sleeve inner portion 244D is arranged in the aforementioned gap 26D. In addition, the sleeve inner portion 244D is arranged opposite to each of at least a portion of the outer circumferential surface 103D of the hollow shaft 31D, at least a portion of a lower surface 104D of the hollow shaft 31D, at least a portion of the inner circumferential surface 102D of the cap 25D, and at least a portion of an upper surface 105D of the cap 25D with a slight gap therebetween. The sleeve outer portion 245D is arranged radially outward of both the hollow shaft 31D and the cap 25D, and is arranged radially opposite to each of at least a portion of an outer circumferential surface of the hollow shaft 31D and at least a portion of the outer circumferential surface 101D of the cap 25D with a slight gap therebetween. The sleeve joining portion 246D is arranged opposite to each of at least a portion of the lower surface 104D of the hollow shaft 31D and at least a portion of the upper surface 105D of the cap 25D with a slight gap therebetween. Further, a lubricating oil 50D is arranged continuously in the above gaps. At least a portion of the sleeve portion 24D, including an inner circumferential surface, an outer circumferential surface, an upper surface, and a lower surface of the sleeve portion 24D, includes a dynamic pressure groove(s) (not shown) defined therein. A fluid dynamic pressure is induced in the lubricating oil 50D by the dynamic pressure grooves (not shown) while the motor 10D is running. The rotating portion 3D, which includes the sleeve portion 24D and the rotor hub portion 33D, is thus supported by the stationary portion 2D, so that the rotating portion 3D can stably rotate.

In the above-described preferred embodiment, the light source is contained in a portion of the laser module which lies below the lower end portion of the hollow shaft. Thus, in the case where the hollow shaft has a small inside diameter, the light source, which may have a large outside diameter, can be held by being contained in the portion of the laser module which lies below the lower end portion of the hollow shaft. Note, however, that at least a portion of the laser module may be arranged axially above the base body. This will lead to an additional reduction in the axial dimension of the rotary drive apparatus as a whole. Also note that the laser module including the light source may alternatively be arranged in the through hole passing through the hollow shaft in the axial direction.

The motor used in the rotary drive apparatus according to each of the above-described preferred embodiments is a so-called outer-rotor motor, in which a magnet is arranged radially outward of a stator. Note, however, that a so-called inner-rotor motor, in which a magnet is arranged radially inward of a stator, may be used in a rotary drive apparatus according to another preferred embodiment of the present invention.

Also note that, in another preferred embodiment of the present invention, a bearing having another structure, such as, for example, a ball bearing, may be used in place of or in addition to a fluid dynamic bearing as used in each of the above-described preferred embodiments.

Note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, rotary drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary drive apparatus arranged to cause incoming light coming from a light source to be emitted to an outside while changing a direction of the incoming light, the rotary drive apparatus comprising:
   a motor including a hollow shaft arranged to extend along a central axis extending in a vertical direction, the hollow shaft including a through hole arranged to pass therethrough in an axial direction;
   a flywheel including (i) at least one of a mirror and a prism arranged to reflect or refract the incoming light, and (ii) a lens to allow the incoming light to pass therethrough; and
   a laser module including the light source; wherein
   the motor includes:
      a stationary portion including a stator; and
      a rotating portion supported through a bearing portion to be rotatable about the central axis with respect to the stationary portion, the rotating portion including a magnet arranged opposite to the stator;
   the stationary portion includes a base portion arranged to directly or indirectly support the stator;
   at least a portion of the laser module is arranged below the base portion;
   the through hole defines a light path along which the incoming light travels;
   the flywheel is supported by the rotating portion; and
   the lens allows the incoming light to pass therethrough after the direction of the incoming light is changed in the flywheel by at least one of the mirror and the prism.

2. The rotary drive apparatus according to claim 1, wherein at least a portion of the laser module is arranged radially inside of the base portion.

3. The rotary drive apparatus according to claim 1, wherein the flywheel includes the mirror, and the mirror is arranged to reflect the incoming light and change the direction of the incoming light.

4. The rotary drive apparatus according to claim 1, wherein the magnet is arranged radially inward of the stator.

5. The rotary drive apparatus according to claim 1, wherein at least a portion of the laser module is fitted to the base portion.

6. The rotary drive apparatus according to claim 1, further comprising one of an adhesion portion, a press fit portion, and a screwing portion arranged to fix the base portion and at least a portion of the laser module to each other.

7. The rotary drive apparatus according to claim 1, wherein
   the base portion includes:
      a cylindrical stator holder arranged to extend in the axial direction, and including an outer circumferential surface to which the stator is fixed; and
      a base body fixed to the stator holder, and arranged to extend radially outward therefrom; and
   at least a portion of the laser module is arranged axially above the base body, and is fixed to the stator holder.

8. The rotary drive apparatus according to claim 1, wherein
   the stationary portion and the rotating portion are arranged opposite to each other with a gap therebetween, the gap having a lubricating oil arranged therein; and
   at least one of the stationary portion and the rotating portion further includes a dynamic pressure groove defined in a portion thereof which defines a portion of the gap.

9. The rotary drive apparatus according to claim 8, wherein the lubricating oil is arranged to exist continuously in the gap.

10. The rotary drive apparatus according to claim 8, wherein the lubricating oil is arranged to exist at two or more separate locations in the gap.

11. The rotary drive apparatus according to claim 8, wherein
   the rotating portion further includes a rotor hub portion having the magnet directly or indirectly fixed thereto, and arranged to extend in an annular shape around the hollow shaft; and
   at least one surface of the lubricating oil is arranged to overlap with the rotor hub portion when viewed in a radial direction.

12. The rotary drive apparatus according to claim 8, wherein
   the hollow shaft includes:
   a cylindrical shaft body arranged to extend along the central axis; and
   a disk-shaped shaft annular portion arranged to extend radially outward from a lower end portion of the shaft body;
   a lowermost surface of the lubricating oil is arranged at a level higher than that of an upper surface of the shaft annular portion; and
   an upper surface of the laser module is arranged at a level lower than that of a lower surface of the shaft annular portion.

13. The rotary drive apparatus according to claim 8, wherein
   the rotating portion further includes:
   a sleeve portion arranged to extend in the axial direction to assume an annular shape around the hollow shaft;
   a first cap arranged to extend radially inward from an upper end portion of the sleeve portion, and including an upper end portion arranged lower than an upper end portion of the hollow shaft; and
   a second cap arranged to extend radially inward from a lower end portion of the sleeve portion, and including a lower end portion arranged higher than a lower end portion of the hollow shaft;
   an upper surface of the lubricating oil is arranged to overlap with the first cap when viewed in a radial direction;
   a lower surface of the lubricating oil is arranged to overlap with the second cap when viewed in the radial direction; and
   the sleeve portion includes a sleeve portion through hole arranged to pass through the sleeve portion in the radial direction below the first cap and above the second cap.

14. The rotary drive apparatus according to claim 1, wherein the laser module includes a portion arranged below a lower end portion of the hollow shaft, and arranged to contain the light source.

15. The rotary drive apparatus according to claim 7, wherein the stator holder includes:
- a cylindrical holder body arranged to extend axially downward beyond the base body; and
- a plate-shaped module holding portion arranged to extend radially inward from the holder body; and
- at least a portion of a lower surface of the laser module is covered with the module holding portion.

16. The rotary drive apparatus according to claim 1, further comprising a module holding cap arranged to cover at least a portion of at least one of a lower surface and a side surface of the laser module, wherein the module holding cap is fixed to the base portion.

17. The rotary drive apparatus according to claim 1, wherein the magnet is arranged radially outward of the stator.

* * * * *